(12) United States Patent
Bissessur

(10) Patent No.: US 7,123,841 B2
(45) Date of Patent: Oct. 17, 2006

(54) OPTICAL TRANSMISSION SYSTEM

(75) Inventor: Hans Bissessur, Paris (FR)

(73) Assignee: Alcatel, Paris (FR)

( * ) Notice: Subject to any disclaimer, the term of this patent is extended or adjusted under 35 U.S.C. 154(b) by 725 days.

(21) Appl. No.: 10/286,827

(22) Filed: Nov. 4, 2002

(65) Prior Publication Data

US 2003/0090770 A1    May 15, 2003

(30) Foreign Application Priority Data

Nov. 12, 2001   (FR) ................... 01 14604

(51) Int. Cl.
*H04B 10/12* (2006.01)
(52) U.S. Cl. ..................... 398/149; 398/194
(58) Field of Classification Search ............. 398/147, 398/148, 149, 158, 159, 194
See application file for complete search history.

(56) References Cited

U.S. PATENT DOCUMENTS

| | | | | |
|---|---|---|---|---|
| 5,532,861 | A * | 7/1996 | Pirio et al. ................ | 398/149 |
| 5,920,416 | A * | 7/1999 | Beylat et al. .............. | 398/185 |
| 6,430,336 | B1 * | 8/2002 | Frankel ..................... | 385/24 |
| 2002/0159691 | A1 * | 10/2002 | Zenteno ..................... | 385/27 |

FOREIGN PATENT DOCUMENTS

EP          09752107 A1     1/2000

OTHER PUBLICATIONS

D. Penninckx, "Enhanced-phase-shaped binary transmission", Electronics Letters, IEEE Stevenage, GB, vol. 36, No. 5, Mar. 2, 2000, pp. 478-480 XP006014910.
D. Penninckx et al, "Experimental Verification of the Phase-Shaped Binary Transmission (PSBT) Effect", IEEE Photonics Technology Letters, IEEE, Inc. NY, US, vol. 10, No. 4 Apr. 1998, pp. 612-614, XP002098378.

* cited by examiner

*Primary Examiner*—Christina Y. Leung
(74) *Attorney, Agent, or Firm*—Sughrue Mion, PLLC

(57) ABSTRACT

The transmission system is suitable for amplitude modulated controlled phase optical signals (S) having an optical phase in each low level pulse that precedes or follows a high level pulse. The system includes an optical link (L) and, to allow a high transmitting power, optical corrector means (FG) are provided for applying optical filtering to the signal R at the exit (B) of the link and/or at one point or a plurality of points of the link (L), to compensate widening of its spectrum that the controlled phase signal (S) may suffer because of phase self-modulation during its transmission. Application to long-haul optical transmission.

11 Claims, 3 Drawing Sheets

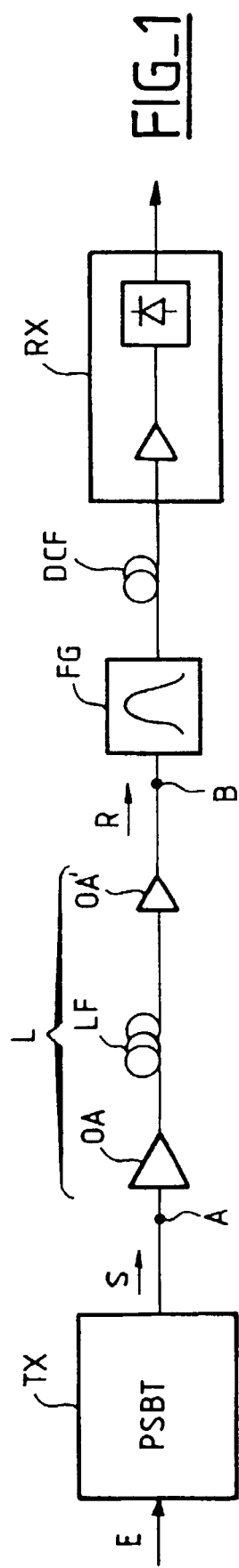
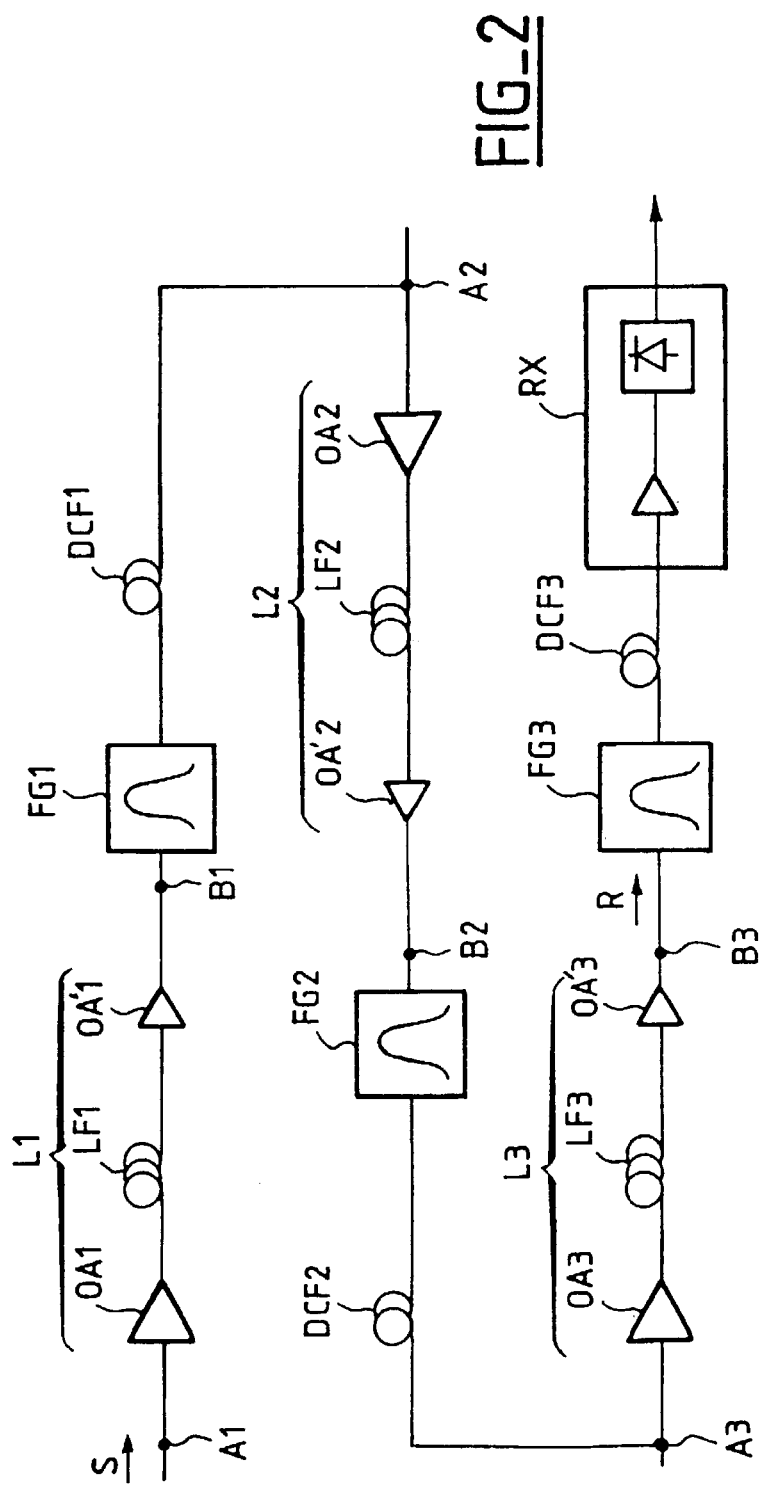

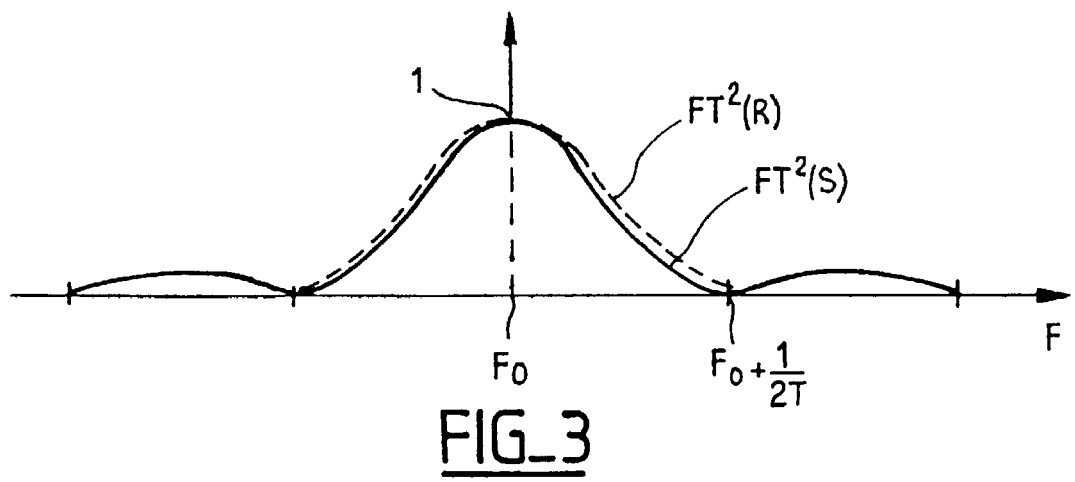
FIG_3
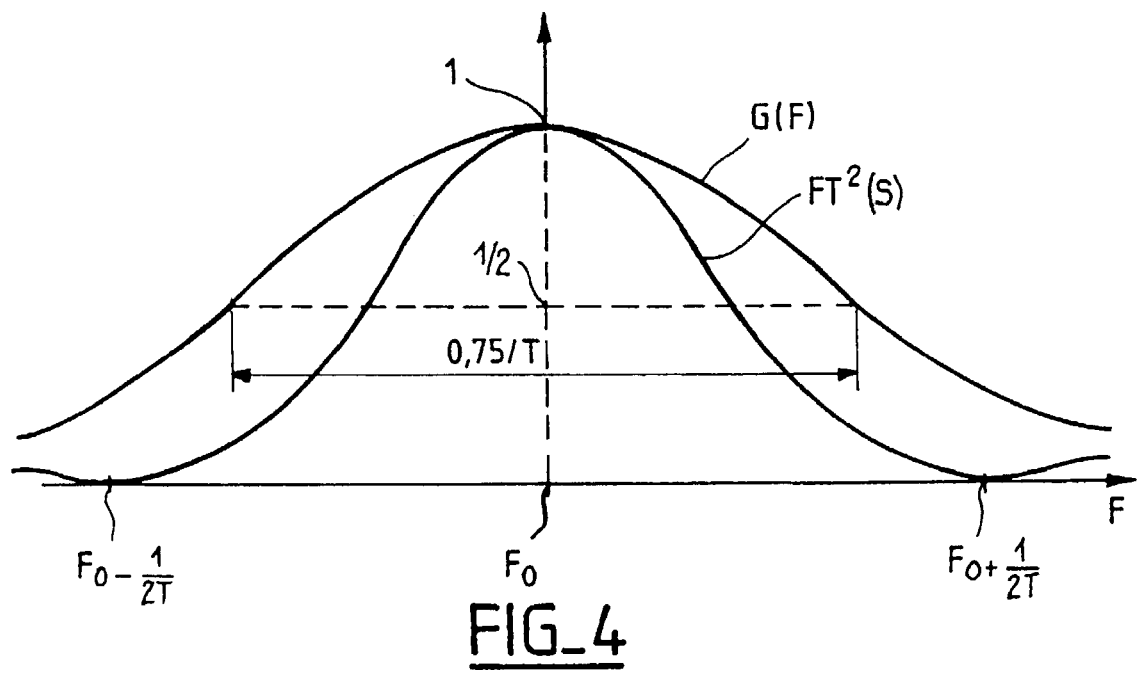
FIG_4
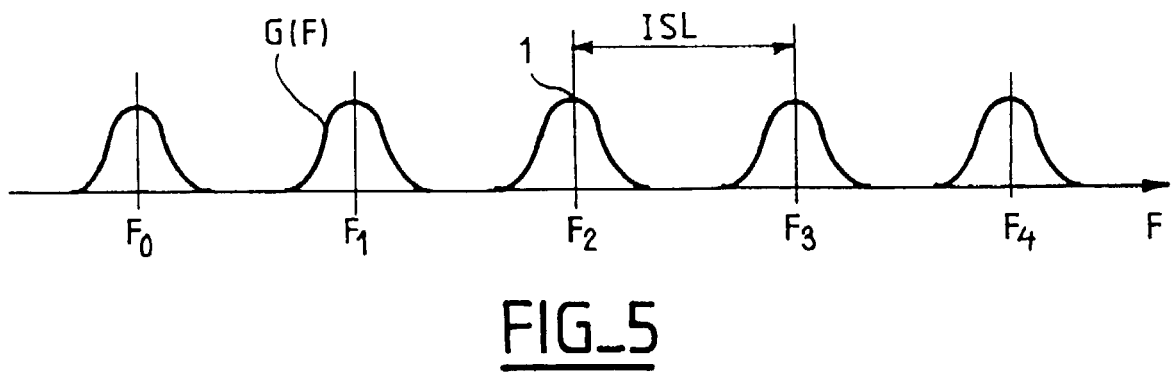
FIG_5

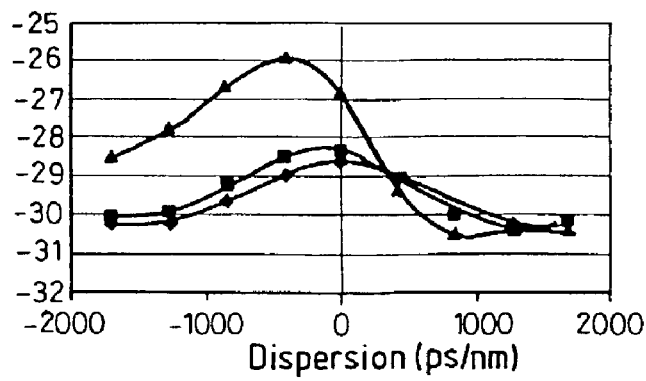
FIG_6
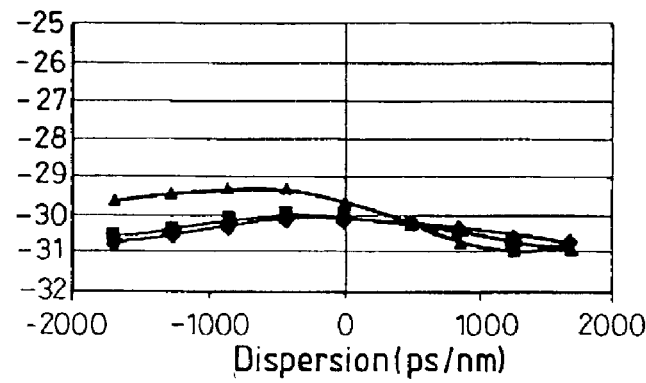
FIG_7
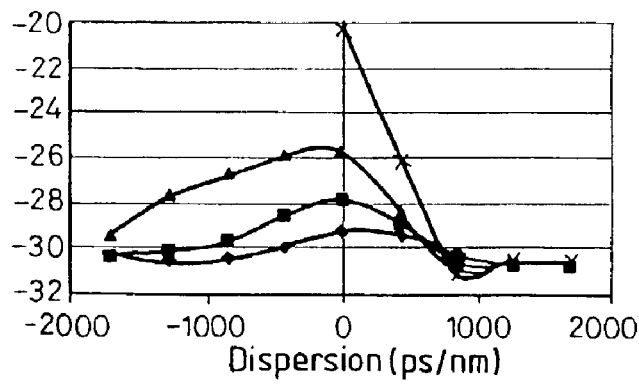
FIG_8
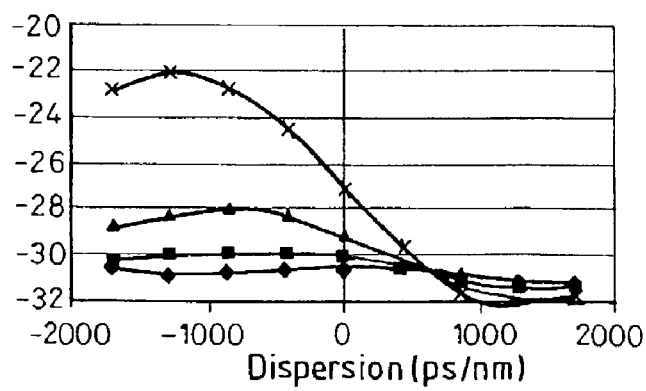
FIG_9

OPTICAL TRANSMISSION SYSTEM

The field of the invention is that of optical telecommunications systems for transmitting digital data. The invention relates more particularly to techniques for transmitting digital optical signals at high bit rates over long-haul links using optical fibers and/or via optical switches.

BACKGROUND OF THE INVENTION

An optical transmission system typically includes an optical transmitter connected to an optical receiver by an optical link that can consist of a single fiber or of a plurality of fiber sections interconnected by optical amplifiers and/or more complex coupling media, for example switches based on optical gates, guides and couplers.

A transmitter includes an optical signal source whose function is to modulate an optical carrier wave as a function of the information to be transmitted. The same link can convey a plurality of signals carried by carrier waves with different wavelengths. The resulting transmission system is known as a wavelength division multiplex (WDM) system.

The modulation technique most widely used at present is amplitude modulation. The modulation formats generally adopted are the NRZ and RZ formats. They code binary information by varying the power of the carrier wave between a low level corresponding to extinction of the wave and a high level corresponding to a maximum optical power. Those variations of level are triggered at times imposed by a clock of fixed period T, which defines successive time cells allocated to the binary data to be transmitted. By convention, the low and high levels usually represent the binary values "0" and "1", respectively.

The amplitude modulation technique, often referred to as amplitude-shift keying (ASK), has the advantage of being relatively easy to implement using proven optical components, but has the disadvantage of being sensitive to chromatic dispersion, however. Although there are devices for compensating chromatic dispersion, such as dispersion compensating fibers (DCF), the compensation obtained is often imperfect, especially for compensating WDM channels distributed across a wide spectral band.

For this reason a new modulation format that is less sensitive to chromatic dispersion has been proposed. The optical transmission method using this format is known as phase-shaped binary transmission (PSBT) and is described, for example, in European Patent Application EP-A-0 792 036, filed Feb. 17, 1997, published Aug. 27, 1997, and the corresponding U.S. Pat. No. 5,920,416 granted Jul. 6, 1999.

To transmit, that method subjects a carrier wave to an optical phase shift with an absolute value of the order of 180° within each cell that corresponds to a logic "0" and that precedes or follows a cell containing a logic "1". At the receiving end, the received optical signal can be converted into an electrical signal in the same way as an NRZ format modulated signal, i.e. using a simple photodetector.

In addition to improving resistance to chromatic dispersion, PSBT modulation also has the property that the spectrum of the resulting signal is half the width of that of NRZ modulation, which is advantageous for dense WDM transmission, in which the spectral gap between WDM channels is narrow.

PSBT modulation nevertheless has limitations as soon as non-linear optical phenomena become significant. This is the case, for example, if the optical power of the signal is increased in order to increase transmission distance. It is then found that, for a given value of the cumulative chromatic dispersion over the link, the quality of the received signal is degraded to a degree that depends strongly on the wavelength of the optical carrier of the signal. The system therefore becomes less resistant to chromatic dispersion, which limits the possibilities of transmitting WDM signals distributed across a wide spectral band over long distances without intermediate amplification.

Another situation in which this problem arises is that in which transmission is effected via optical coupling media including components that are non-linear even at low powers, for example optical gates based on semiconductor optical amplifiers. This latter situation is typically encountered in networks equipped with switches using that kind of optical gate.

A solution to the problem of a PSBT signal being degraded by the Kerr effect (phase self-modulation, phase or gain cross-modulation) is proposed in European Patent Application EP-A-0 975 107, filed Jul. 20, 1998 and published Jan. 26, 2000. The solution consists of using PSBT modulation modified to introduce a transient "chirp" whose sign and optimum value depend in particular on the cumulative dispersion in the link and on non-linear effects. However, producing the optimum transient "chirp" is no simple matter, and can further have the effect of widening the spectrum of the optical signal, which makes PSBT modulation less advantageous for dense WDM transmission.

Another way to circumvent some non-linear phenomena is to choose modulation techniques which maintain a constant optical power of the signal. This is the case with optical phase or frequency modulation. Frequency-shift keying (FSK) has the disadvantage that the resulting signal is sensitive to chromatic dispersion, however. Phase-shift keying (PSK) is less sensitive to chromatic dispersion but requires the phase of the signal to be perfectly stable for correct detection at the receiver. However, a variant known as differential phase-shift keying (DPSK) has the advantage of reducing this latter constraint. PSK or DPSK modulation nevertheless leads to a spectral width of the signal that is the same as with the NRZ modulation format, and thus less favorable than PSBT modulation for dense WDM transmission.

OBJECTS AND SUMMARY OF THE INVENTION

Accordingly, an object of the invention is to propose a transmission system using PSBT modulation with no transient chirp, but adapted to render the transmitted signal less sensitive to chromatic dispersion and to the Kerr effect, more specifically to phase self-modulation.

To be more precise, the invention provides a transmission system for transmitting controlled phase optical signals modulated at the timing rate of a clock of period T which defines successive time cells defining in the signal low levels or high levels of modulation of an optical carrier wave of optical frequency $F_0$, said signal having an optical phase shift in each time cell which defines a low power level and which precedes or follows a cell which defines a high power level, said system including an optical link adapted to transmit said controlled phase signal from an entry end to an exit end to deliver a corresponding output signal, and said system being characterized in that it includes optical corrector means coupled to said exit end and/or inserted at one or more points of said optical link, said corrector means applying optical filtering to the signal at said exit end and/or at said points of said optical link, said filtering being set to compensate widening of its spectrum that said controlled phase signal might suffer because of phase self-modulation as it is transmitted in said optical link.

The invention takes account of the observation that a PSBT modulation format signal transmitted in a non-linear medium suffers widening of its spectrum because of phase self-modulation as it propagates in the medium and that the quality of the signal can be improved by applying optical filtering to restore the spectral width of the transmitted signal to that of the original PSBT signal.

Accordingly, the filter transfer function is chosen to reduce the spectral width sufficiently to eliminate some of the spectral components created by phase self-modulation without exaggerated attenuation of the central portion of the spectrum, as this would result in a loss of information contained in the signal, which would be the opposite of what is required. As a general rule, the filter transfer function chosen can be considered as a compromise between compensating the widening of the spectrum and the resulting loss of information.

Particular cases have been simulated and subsequent experimental verification has yielded a filter characteristic that can be suitable in practice for the usual situations. Moreover, it has been found that the benefit of compensating the widening of the spectrum increases if the filtering is distributed along the link, downstream of the components that are the seat of non-linear phenomena. This observation leads in particular to different forms of filtering according to whether the link comprises one section or a plurality of sections.

To be more precise, in a first embodiment of the invention suitable for the situation in which the ink includes a single section of line fiber and said optical corrector means comprise an optical filter coupled to said exit end and having a transfer function expressing variations as a function of the optical frequency f of its transmission coefficient that is approximately Gaussian in the vicinity of $F_0$, centered at $F_0$, with a half-height spectral width from 0.5/T to 1.25/T, and advantageously substantially equal to 0.75/T.

In a second embodiment of the invention suitable for the situation in which the link comprises N sections having N respective entry ends, N respective exit ends, and N respective optical amplifiers followed by N respective line fibers, said optical corrector means comprise N optical filters respectively coupled to said N exit ends of said sections and such that the transfer function of an equivalent filter formed by coupling said N filters in cascade, expressing variations of its transmission coefficient as a function of the optical frequency F, is approximately Gaussian in the vicinity of $F_0$, centered at $F_0$, with a half-height spectral width from 0.5/T to 1.25/T, and advantageously substantially equal to 0.75/T.

According to another aspect of the invention, regardless of the type of link (one section or a plurality of sections), the or each optical filter (FG) is a periodic filter having a free spectral interval, when expressed in terms of frequency, greater than 1/T.

The invention applies equally to optical transmission systems for wavelength division multiplexed PSBT format signals. This kind of system is therefore adapted to transmit a multiplex formed of a plurality of controlled phase optical signals carried by a plurality of respective optical carrier waves whose successive optical frequencies have a given frequency shift. In this case, and according to another aspect of the invention, the or each optical filter is advantageously a periodic filter having a free spectral interval, when expressed in terms of frequency, equal to said frequency shift. Because of this, a single filter is sufficient to process simultaneously the various signals forming the multiplex.

BRIEF DESCRIPTION OF THE DRAWINGS

Other aspects and advantages of the invention will become apparent in the remainder of the description, which refers to the figures.

FIG. 1 shows diagrammatically a transmission system of the invention in the case of an optical link consisting of a single section.

FIG. 2 shows diagrammatically a transmission system of the invention in the case of an optical link consisting of a plurality of sections.

FIG. 3 shows diagrammatically spectra of PSBT format modulated signals transmitted and received in the case of a conventional transmission system.

FIG. 4 shows a filter transfer function that can be used in a transmission system of the invention.

FIG. 5 shows a periodic filter transfer function that can be used in a WDM transmission system of the invention.

FIGS. 6 and 7 show, respectively for conventional transmission systems and transmission systems of the invention, and for various signal optical power values, the variation in the sensitivity of a receiver as a function of chromatic dispersion in the case of an optical link consisting of a single section.

FIGS. 8 and 9 show, respectively for conventional transmission systems and transmission systems of the invention, and for various signal optical power values, the variation in the sensitivity of a receiver as a function of chromatic dispersion in the case of an optical link consisting of three sections.

MORE DETAILED DESCRIPTION

FIGS. 1 and 2 show diagrammatically and by way of example two optical transmission systems of the invention.

In the case of FIG. 1, the system includes an optical link L consisting of a single section between a transmitter TX and a receiver RX. As a function of a source signal, which is, for example, an electrical signal E modulated to the NRZ format at the timing rate of a clock with period T, the transmitter TX is adapted to deliver a controlled phase optical signal S modulated to the PSBT format at the same clock timing rate, as described in detail in the documents previously cited. The receiver RX essentially includes an optical preamplifier followed by a photodetector.

The link L has an entry end A adapted to receive the signal S and an exit end B situated in the vicinity of the receiver RX and adapted to deliver a corresponding output signal R. The link L consists mainly of a line fiber LF and a transmit optical amplifier OA disposed between the transmitter TX and the fiber LF. To improve the signal-to-noise ratio at the receiver, a receive optical preamplifier OA' can additionally be provided downstream of the fiber LF.

In a conventional system, the output signal R would be coupled to the receiver RX directly, or possibly via a DCF to compensate chromatic dispersion. A band-pass filter centered on the frequency of a signal carrier wave can also be provided upstream of the receiver, for example to extract a channel in the case of WDM transmission or to attenuate noise outside the band of the signal. In this case, the coefficient of transmission of the filter as a function of the optical frequency always has a spectral width very much greater than the clock frequency 1/T of the modulation of the signal.

To be able to increase the transmission distance using a single section, the length of the fiber LF must be increased and the resulting increased attenuation compensated by increasing the optical power of the signal injected into the fiber LF. Beyond a particular power, the fiber is the seat of significant non-linear optical phenomena (Kerr effect).

In particular, in the case of a PSBT format modulated signal, which in the absence of non-linear effects is relatively insensitive to chromatic dispersion, a reduced tolerance to the cumulative chromatic dispersion in the link is observed. This results in a limitation of transmission capacity, for example in the case of WDM signals.

By analyzing this phenomenon in more detail, it has been found that the deterioration correlates to a widening of the spectrum of the signal as it propagates in the fiber. FIG. 3 shows this.

FIG. 3 shows in continuous line an approximate curve for the spectrum of the transmitted signal S modulated to the PSBT format. This spectrum, which expresses the variations of the normalized power spectral density $FT^2(S)$ as a function of the optical frequency F, corresponds to a PSBT signal with optical carrier frequency $F_0$ and bit period T. FIG. 3 also shows in dashed line the curve $FT^2(R)$ representing the spectrum of the received signal R in the case of a conventional link. Thus as the signal is transmitted in the link its spectrum suffers widening attributed primarily to phase self-modulation of the signal.

According to the invention, an optical filter FG is coupled to the exit end B and thus inserted between that end B and the receiver RX. The filter is set to reduce the width of the spectrum of the signal R to compensate, or even overcompensate, the widening that occurs in the fiber.

An appropriate ideal filter characteristic for each particular link can be determined by simulation and experiment. Filters that may be suitable in practice are typically Gaussian (or approximately Gaussian) filters having a transfer coefficient (which expresses the variations of the transmission coefficient of the filter as a function of the optical frequency F) centered on $F_0$ and with a half-height spectral width from 0.5/T to 1.25/T.

The half-height spectral width is preferably around 0.75/T.

FIG. 4 shows a curve representing the normalized transfer function G(F) corresponding to this latter case. This transfer function can also be expressed by the following equation:

$$G(F)=\exp[-a^2.(F-F_0)^2.T^2)$$

Accordingly, if F and $F_0$ are expressed in Hertz and T in seconds, it is found that $a^2$ is substantially equal to 4.93.

In other transmission systems, the link is made up of a plurality of sections. FIG. 2 shows a link with three sections, for example.

Research has shown that it is preferable to distribute the filtering along the link, and the filtering in the case of a link comprising a plurality of sections is therefore different to that for the first situation explained above.

As shown in FIG. 2, the link is made up of a succession of sections L1, L2, L3. Each section is identical to the link L from FIG. 1. Each section L1–L3 has an entry end A1–A3 and an exit end B1–B3, a transmit optical amplifier OA1–OA3 followed by a line fiber LF1–LF3, a receive optical preamplifier OA'1–OA'3 and a chromatic dispersion compensator DCF1–DCF3. The entry end A1 of the first section L1 is adapted to receive the signal S from the transmitter TX (not shown) and the exit end B3 of the last section L3 is situated in the vicinity of the receiver RX and adapted to deliver a corresponding output signal R.

According to the invention, the optical corrector means comprise a plurality of optical filters FG1, FG2, FG3 coupled to respective exit ends BE1, B2, B3 of the sections so as to be inserted between the exit ends B1, B2 and the respective entry ends A2, A3 of the following sections, except for the last filter, which is inserted between the exit end B3 of the last section and the receiver RX.

As previously, an appropriate optimum filter characteristic for each particular link can be determined by simulation and experiment.

In practice, the filters FG1, FG2, FG3 are advantageously chosen so that the transfer function of the equivalent filter that would be formed by coupling the filters in cascade is approximately Gaussian in the vicinity of $F_0$, centered on $F_0$, with a half-height spectral width from 0.5/T to 1.25/T. The half-height spectral width is preferably substantially equal to 0.75/T.

Accordingly, in the case of a link with N sections, taking N identical Gaussian filters with transfer function $Gi(F)=\exp[-b^2.(F-F_0)^2.T^2]$, the equivalent transfer function for the N filters in cascade is:

$$Ge(F)=\exp[-N.b^2.(F-F_0)^2.T^2]$$

Thus $N.b^2=a^2$, which implies for each of the filters a half-height spectral width N times greater than that for the filter used when the link comprises only one section.

Regardless of the type of link (i.e. a link with one section or one with a plurality of sections), each of the optical filters can be a periodic filter, such as a Fabry-Perot filter, respecting the preceding criteria, provided that its free spectral interval, when expressed in terms of frequency, is greater than 1/T.

The systems just described can also be used for WDM transmission of PSBT format signals. The transmitter TX can then include means (not shown) for modulating and combining a plurality of PSBT format signals carried by a plurality of respective optical carrier waves with different optical frequencies. The receiver RX then includes means (not shown) for demultiplexing the received signal to separate the various spectral components.

In this case, one particularly simple way to implement the invention consists of using optical filters in the form of periodic filters having a free spectral interval ISL equal to the shift between the successive optical frequencies of the optical carrier waves of the multiplex.

This is shown diagrammatically in FIG. 5, which shows the transfer function G(F) of a periodic filter suitable for multiplex transmission of channels carried by carrier waves with optical frequencies $F_0$, $F_1$, $F_2$, $F_3$, $F_4$.

To assess the efficacy of the invention, the quality of the received signals has been evaluated for conventional transmission systems and for the same systems employing optical correction of the invention.

FIGS. 6 to 9 show a few of the results obtained, in the form of sensitivity curves representing variations in the sensitivity of a receiver as a function of chromatic dispersion for different values of the optical power P of the transmitted signal. The chromatic dispersion is that known as "residual" chromatic dispersion, i.e. the cumulative dispersion introduced by all of the components of the link, in particular line fiber(s), chromatic dispersion compensators and, where applicable, the corrector means (filters) of the invention.

The sensitivity used to evaluate transmission quality is defined here as the minimum average optical signal power (in dBm) to be applied to the receiver to obtain an error rate set at $10^{-9}$.

The curves shown were obtained with links comprising 100 km of standard fiber and PSBT format modulated signals transmitted at 10 Gbit/s. The electro-optical modulator used was a Mach-Zehnder modulator controlled in push-pull mode by an electrical signal filtered by a Bessel filter with a bandwidth of 2.8 GHz.

FIGS. 6 and 7 concern firstly the case of an optical link consisting of a single 100 km section, as shown in FIG. 1. FIG. 6 corresponds to a conventional system, i.e. one with no filter FG. FIG. 7 corresponds to a system of the invention, i.e. one in which the exit end of the link is coupled to a filter FG with a half-height spectral width equal to 7.5 GHz or, when expressed in terms of wavelength, equal to 0.06 nm, for a carrier wavelength of 1.55 µm.

Each of the figures shows three sensitivity curves for respective powers P of the signal supplied by the transmit amplifier OA to the fiber LF of 0 dBm, 6 dBm and 12 dBm.

Looking first at the FIG. 6 curves, note that beyond 6 dBm the received signal is strongly degraded for cumulative dispersion values less than +500 ps/nm. In other words, with a high transmit optical power, the system is not tolerant of chromatic dispersion, which limits the possibilities of transmitting broadband WDM signals over long distances without intermediate amplification.

Comparing these curves to those of FIG. 7, note that the invention achieves a significant improvement in resistance to chromatic dispersion, even for negative dispersion values.

FIGS. 8 and 9 concern the case of an optical link consisting of three 100 km sections, as shown in FIG. 2. FIG. 8 corresponds to a conventional system, i.e. one with no filters FG1, FG2, FG3. FIG. 9 corresponds to a system of the invention, i.e. one in which each of the three sections is provided at the exit end with a filter FG1, FG2, FG3 with a half-height spectral width equal to 13 GHz or, when expressed in terms of wavelength, equal to 0.10 nm, for a carrier wavelength of 1.55 µm.

Each of the figures shows four sensitivity curves for respective powers P of the signal applied to each fiber LF1, LF2, LF3 of 0 dBm, 6 dBm, 9 dBm and 12 dBm.

Looking at the FIG. 8 curves, note that for values of cumulative dispersion less than +500 ps/nm the received signal becomes significantly degraded from 9 dBm and is very strongly degraded at 12 dBm. Comparing these curves to those of FIG. 9, the improvement obtained by the invention is clear.

It is interesting to note that the presence of the filter or filters of the invention does not introduce any penalty at low powers.

The above curves also show the benefit of a link having positive cumulative chromatic dispersion, which generally implies the introduction of chromatic dispersion compensation. In this case, as has been verified elsewhere, the compensation is preferably divided between the various sections that constitute the link.

To be more precise, as shown in FIG. 2, the transmission system then includes chromatic dispersion compensators DCF1, DCF2, DCF3 coupled to the respective sections L1, L2, L3 so that the cumulative chromatic dispersion introduced by those sections (L1, L2, L3), the associated optical filters (FG1, FG2, FG3), and the associated chromatic dispersion compensators (DCF1, DCF2, DCF3) is positive for the optical frequency $F_0$ of the optical carrier wave of the controlled phase optical signal S or, in the case of WDM transmission, for the average optical frequency of the optical carrier waves of the controlled phase optical signals forming the multiplex.

The invention claimed is:

1. A transmission system for transmitting controlled phase optical signals modulated at the timing rate of a clock of period T which defines successive time cells defining in the signal low levels or high levels of modulation of an optical carrier wave of optical frequency $F_0$, said signal having an optical phase shift in each time cell which defines a low power level and which precedes or follows a cell which defines a high power level, said system comprising:

an optical link adapted to transmit said controlled phase signal from an entry end of the link to an exit end of the link; and optical corrector means coupled to said exit end and/or inserted at one or more points of said optical link, wherein said corrector means applies optical filtering to the signal at said exit end and/or at said points of said optical link, said filtering being set to compensate widening of a spectrum that said controlled phase signal might suffer because of phase self-modulation as the signal is transmitted in said optical link, and wherein said corrector means does not include a reactor and comprises at least one filter having an effective transfer function expressing variations as a function of the optical frequency F of a transmission coefficient of the optical link that is approximately Gaussian in a vicinity of $F_0$, centered at $F_0$, with a half-height spectral width from 0.5/T to 1.25/T.

2. A transmission system according to claim 1, wherein said link comprises a single section of line fiber and said optical corrector means comprise an optical filter coupled to said exit end and having a transfer function expressing variations as a function of the optical frequency f of the transmission coefficient of the single section of the line fiber that is approximately Gaussian in a vicinity of $F_0$, centered at $F_0$, with a half-height spectral width from 0.5/T to 1.25/T.

3. A transmission system according to claim 2, wherein said half-height spectral width is substantially equal to 0.75/T.

4. A transmission system according to claim 2, wherein said optical filter is a periodic filter having a free spectral interval, when expressed in terms of frequency, greater than 1/T.

5. A transmission system according to claim 4, wherein said system is adapted to transmit a wavelength division multiplex formed of a plurality of controlled phase optical signals carried by a plurality of respective optical carrier waves with successive optical frequencies ($F_0$, $F_1$, $F_2$, $F_3$) having a given frequency shift and said free spectral interval is equal to said frequency shift.

6. A transmission system according to claim 1, wherein said link comprises N sections having N respective entry ends, N respective exit ends, and N respective optical amplifiers followed by N respective line fibers, and wherein said optical corrector means comprise N optical filters respectively coupled to said N exit ends of said sections such that the transfer function of the equivalent filter formed by coupling said N filters in cascade, expressing variations of its transmission coefficient as a function of the optical frequency F, is approximately Gaussian in the vicinity of $F_0$, centered at $F_0$, with a half-height spectral width from 0.5/T to 1.25/T.

7. A transmission system according to claim 6, wherein said half-height spectral width is substantially equal to 0.75/T.

8. A transmission system according to claim 6, wherein each of said optical filters is a periodic filter having a free spectral interval greater than 1/T.

9. A transmission system according to claim 8, wherein that said system is adapted to transmit a wavelength division multiplex formed of a plurality of controlled phase optical signals carried by a plurality of respective optical carrier waves with successive optical frequencies having a given frequency shift and said free spectral interval is equal to said frequency shift.

10. A transmission system according to claim 6, further comprising respective chromatic dispersion compensators coupled to said N sections so that the cumulative chromatic dispersion introduced by said sections, said associated optical filters, and said associated chromatic dispersion compensators is positive for the optical frequency $F_0$ of said optical carrier wave of said controlled phase optical signal or where applicable for an average optical frequency of said optical carrier waves of said controlled phase optical signals forming a multiplex.

11. The transmission system according to claim 1, wherein the optical filtering sets the spectrum to a transfer function $G(F)=\exp[-a^2*(F-F_0)^2*T^2]$, wherein F and $F_0$ are frequencies, T is time, and $a^2$ is a constant.

* * * * *